US011279105B2

(12) United States Patent
Welker et al.

(10) Patent No.: US 11,279,105 B2
(45) Date of Patent: Mar. 22, 2022

(54) FORMING POLYMER OPTICAL DEVICES BY MOLD-CONSTRAINED RELAXATION EXPANSION

(71) Applicant: Incom, Inc., Charlton, MA (US)

(72) Inventors: David James Welker, Vancouver, WA (US); Kenneth Christopher Nardone, North Bennington, VT (US); Evan Franklin DeBlander, Portland, OR (US); Eric Robert Davidson, Vancouver, WA (US)

(73) Assignee: Incom, Inc., Charlton, MA (US)

( * ) Notice: Subject to any disclaimer, the term of this patent is extended or adjusted under 35 U.S.C. 154(b) by 301 days.

(21) Appl. No.: 16/446,803

(22) Filed: Jun. 20, 2019

(65) Prior Publication Data

US 2019/0389162 A1 Dec. 26, 2019

Related U.S. Application Data

(60) Provisional application No. 62/688,789, filed on Jun. 22, 2018.

(51) Int. Cl.
*B29D 11/00* (2006.01)
*B29C 61/04* (2006.01)
*B29L 11/00* (2006.01)
*G02B 6/06* (2006.01)

(52) U.S. Cl.
CPC ........ *B29D 11/00721* (2013.01); *B29C 61/04* (2013.01); *B29L 2011/0075* (2013.01); *G02B 6/06* (2013.01)

(58) Field of Classification Search
CPC ..... B29D 11/00721; B29C 61/04; G02B 6/06; B29L 2011/0075
See application file for complete search history.

(56) References Cited

U.S. PATENT DOCUMENTS

| | | | | |
|---|---|---|---|---|
| 3,626,040 | A | * 12/1971 | Nagao | B29C 43/006 264/1.28 |
| 3,825,648 | A | * 7/1974 | Kulkarni | B29C 43/16 264/322 |
| 4,602,926 | A | 7/1986 | Harrison et al. | |
| 5,073,314 | A | 12/1991 | Coutandin et al. | |
| 2003/0207983 | A1 | 11/2003 | Sone et al. | |
| 2004/0223708 | A1* | 11/2004 | Cho | G02B 6/02038 385/102 |
| 2005/0008821 | A1 | 1/2005 | Pricone | |
| 2005/0152044 | A1 | 7/2005 | Tang | |
| 2007/0257387 | A1 | 11/2007 | Hofmann et al. | |

* cited by examiner

*Primary Examiner* — Mathieu D Vargot
(74) *Attorney, Agent, or Firm* — BainwoodHuang

(57) ABSTRACT

A method of making a waveguiding optical component includes processing a polymer optical material to form a billet having an axis of light transmission and having residual stress maintaining a transverse extent of the billet; placing the billet into a mold, the mold being configured to constrain transverse expansion of the billet according to a desired shape of the waveguiding optical component; and heating the billet in the mold to induce relaxation of the residual stress and corresponding transverse expansion of the billet, thereby forming the billet into the waveguiding optical component with the desired shape. An alternative method begins with a collection of individual canes or fiber segments which are fused during the heating process, bypassing a separate process of forming a billet.

20 Claims, 8 Drawing Sheets

FORMING POLYMER OPTICAL DEVICES BY MOLD-CONSTRAINED RELAXATION EXPANSION

BACKGROUND

The present disclosure relates to optical devices such as polymer imaging tapers and to methods for manufacturing unique shapes with inherent properties. Although the disclosed techniques have particular use with imaging tapers and are described with reference thereto, the disclosed techniques may also be used in connection with other types of optical devices.

A polymer taper may be used to transfer a two-dimensional image, either increasing or decreasing the size of the image depending on the direction of image transfer. The taper may be made of wave-guiding fibers. The fibers may be polymer core fibers, with each core being surrounded by a cladding which has a different index of refraction than the core. Fibers are grouped together during production to create the taper material. Other fiber types may be used.

It has been known to create polymer tapers utilizing a heat-and-pull technique. This typically involves starting out with a uniform billet (e.g., cylinder), clamping each end, heating a section such as the center, and then pulling or stretching the ends apart from each other. This creates a stretched out or hourglass shape. By cutting the hourglass shape in the center, two tapers can be created. Typically the billet as well as the final taper are circular or oval in cross section, although other shapes are possible. The billet is formed from a collection of fibers or canes in a separate preceding process.

DETAILED DESCRIPTION

Shortcomings of Prior Techniques

Figure 1:
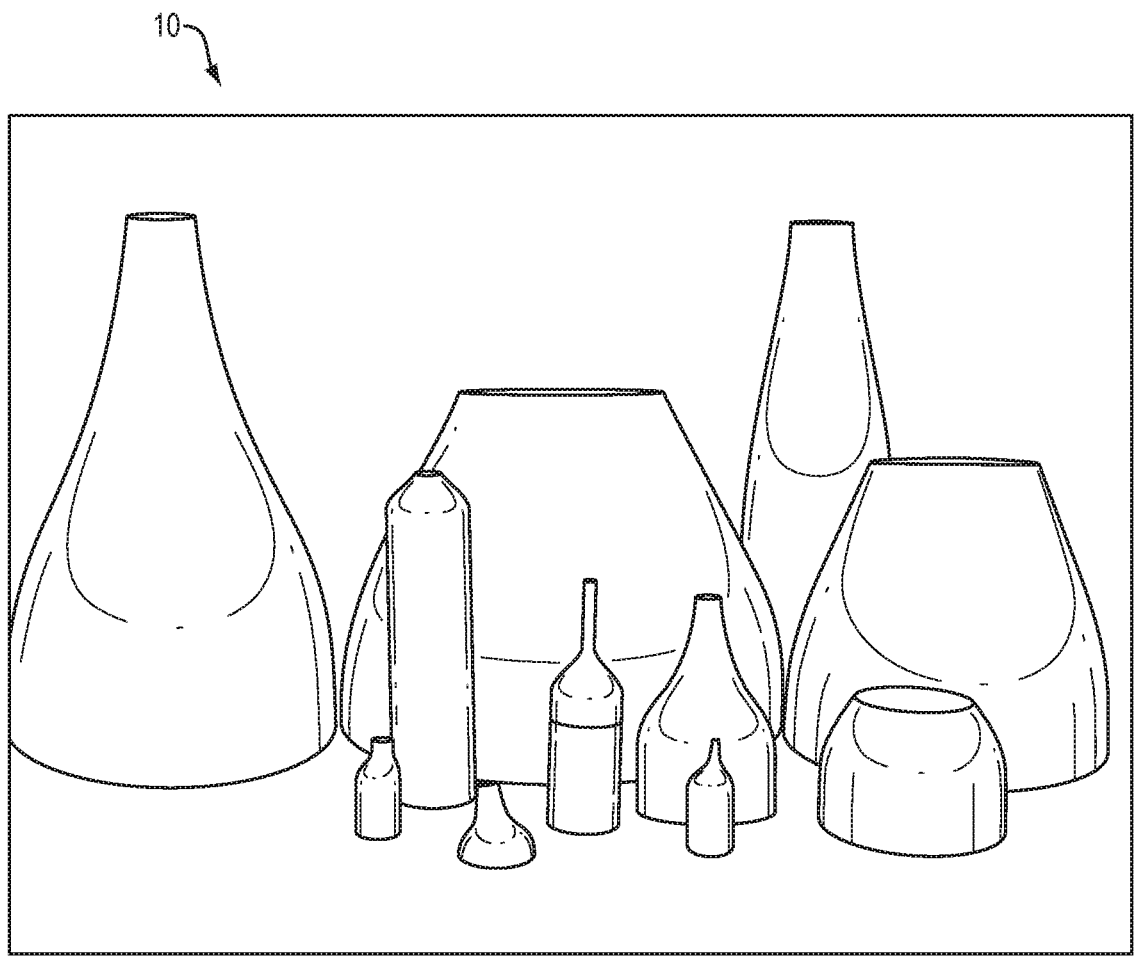
FIG. 1 shows examples of tapers made in the prior art manner.

The above "heat and stretch" technique generally results in tapers with relatively gradual transitions of their cross sections along their length. To expand a taper a large amount (radially) over a short distance (axial) is generally not possible with the heat and stretch method. This characteristic is exhibited in the examples of FIG. 1, in which the axial length of the taper region is generally greater than the diameter of the taper. Nor is it generally possible to pull at high angles and have the individual fiber ends be perpendicular to the input and output faces, over short taper distances. This technique is also size limited.

Additionally, heating the billet in the above manner has the potential of releasing the "memory" or residual stresses that the individual fibers have from a preceding fiber drawing process. Although the tapers are held from the ends and pulled under tension, the stress in the fibers may still be released in the section that is heated. This can cause axial distortion of the taper, as well as radial distortion as a result of the taper not being under full thermal equilibrium from center to edge. This distortion can potentially negatively affect the final imaging capability of the taper.

Another common attribute of polymer tapers is that the fibers are parallel or close to parallel to the axis of the taper at both extreme ends of the taper, if the taper is pulled to a relatively long distance. The ends of the taper can be flat or profiled, but the fibers ends will generally still be parallel or close to parallel by design. If the fibers are angled, they will typically be angled towards the axis of the taper, which is a result of the fibers being stretched from the larger end to the center of the hourglass shape.

Overview

One aspect of the present disclosure relates to a taper product which can be shorter in axial length than a traditional heat-and-pull taper, while providing almost any desired magnification. While the heat-and-pull method requires a stretching of the polymer along its axis, a disclosed stress release method does not utilize stretching and can create a given image magnification over a shorter axial distance. This method utilizes the release of inherent stresses to create the final shape.

An additional aspect of the present disclosure relates to a taper product which has fibers at one or both ends of the taper, around the outer edge or a section of the outer edge, which are not parallel to the axis of the taper. This allows for a greater viewing angle of an image regarding the edge or perimeter of the taper. This method also utilizes the release of inherent stresses to create the final shape.

Generally, the present disclosure relates to processes for creating polymer optical devices such as polymer tapers which utilize the inherent manufacturing residual stresses in the polymer to create the end taper shape. Stresses are released in the material under elevated temperatures, allowing shrink-back of the polymer into a new controlled shape. This controlled shape can be facilitated by using a preformed mold. This is a departure from the traditional heat-and-pull method, with the potential of less distortion and clearer images through the taper regarding center to edge distortion.

In one specific aspect, a method is disclosed of making a waveguiding optical component, including:

processing a polymer optical material to form a billet having an axis of light transmission and residual stress maintaining a transverse extent of the billet;

placing the billet into a mold, the mold being configured to constrain transverse expansion of the billet according to a desired shape of the waveguiding optical component; and heating the billet in the mold to induce relaxation of the residual stress and expansion of the billet, thereby forming the billet into the waveguiding optical component with the desired shape.

In the above method, the relaxing billet expands in the transverse direction to fill the mold, giving the resulting component the desired shape. The mold may have very short-length transitions, which the expanding billet will conform to. The billet can be pre-formed in a separate process that includes first drawing canes of a desired size, while controlling the amount of residual stress. The canes are stacked and heated to fuse them into the billet, while continuing to control for residual stress to enable the above processing of the billet to yield the desired result.

In another specific aspect, a method is disclosed of making a waveguiding optical component, including:

placing a plurality of aligned polymer optical canes into a mold, the canes having residual stress maintaining transverse extents thereof, the mold being configured to constrain transverse expansion of the canes according to a desired shape of the waveguiding optical component; and heating the canes in the mold to induce relaxation of the residual stress and expansion of the canes, thereby (a) fusing the canes and (b) forming the fused canes into the waveguiding optical component with the desired shape.

The above second method is similar to the first but essentially merges the making of the billet (block) and the final component.

Heating may use a conventional oven or an oven sealed to maintain vacuum, which can be helpful to avoid entrapment of gases if the mold is complicated. Additionally, in the processing of the canes and/or billet, compressive forces may be applied axially or radially to improve the process (e.g., make it faster and/or require lower temperature).

The process may employ optical fibers rather than canes as starting material.

In some embodiments, the mold is generally cylindrical and has an interior having two regions of different cross-sectional sizes joined by a taper region. For example, the may be circularly cylindrical and the two regions have respective different radiuses. Alternatively, the mold may have a rectangular cross-section and the two regions have respective different lengths and widths. The taper region may have a length less than half of the cross-sectional sizes of the regions.

In some embodiments, the mold is configured for only partial constraining of the billet or canes, and during the transverse expansion the billet/canes have a constrained portion and an unconstrained portion, the constrained portion being constrained by the mold and taking on a shape thereof during the heating, the unconstrained portion not being constrained by the mold and expanding beyond an envelope of the mold during the heating to form a flared portion of the waveguiding optical component. The mold may be generally cylindrical and have a length shorter than an axial length of the billet/canes, and the billet/canes are placed into the mold with one end extending beyond a corresponding end of the mold, the one end being the unconstrained portion of the billet/canes. The unconstrained portion may take on a mushroom-cap shape during the heating, and additional processing of the waveguiding optical component may be used to flatten a central portion of the mushroom-cap-shaped unconstrained portion.

Generally, the method further includes additional processing of the waveguiding optical component to create a final optical component, which may include trimming the waveguiding optical component in the transverse direction to produce the final optical component having a corresponding axial length. In one embodiment, the waveguiding optical component has a repeating pattern of wider and narrower portions joined by respective tapers, and the trimming includes slicing the waveguiding optical component into a plurality of single-taper final optical components each including a respective one of the tapers.

DESCRIPTION OF EMBODIMENTS

Generally, the disclosed technique is directed to residual stress-induced directional shrinkage and expansion to create tapers in polymer waveguides.

The process may begin with a pre-made block or billet having residual stress, which may be formed as described below. This block is machined to an inner shape of a mold. The machined block is placed in the mold, then placed in an oven to be heated to a certain temperature, which induces relaxation of the residual stresses so that the block expands transversely and fills the mold. The block is then allowed to cool and removed from the mold, then cut and polished to desired final form.

The waveguide may employ standard fused polymer fibers or other light-guiding fiber types. In one example the waveguide employs a fiber configured to provide so-called transverse Anderson localization or TAL.

The mold may be of almost any shape. It may be round, rectangular, or square for example. The waveguide material may only be allowed to expand in one direction perpendicular to the direction of light travel or in multiple directions perpendicular to the direction of light travel. Rectangular or square tapers are useful, for example, in applications in which displays are expanded to eliminate the bezel on one or more sides.

The length of the taper region is controllable by the mold and amount of residual stress left in the material. It is possible to control the amount of residual stress in the fused blocks through processing parameters. The mold may have one expansion region or multiple expansion regions.

Temperatures and times used for the expansion process are related to the amount of residual stress purposefully left in the fused block, which results from times and temperatures used to initially draw the canes and times and temperatures used to fuse the canes into the block.

Figure 2:
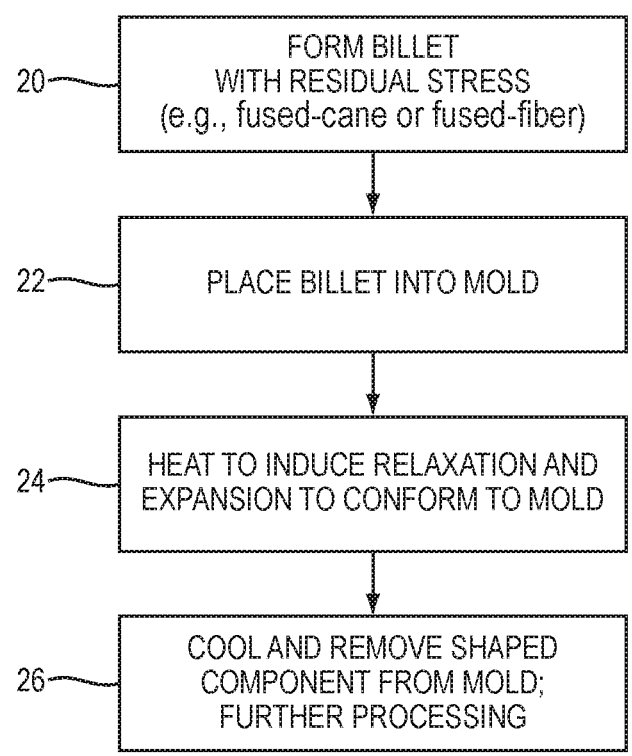
FIG. 2 is a flow diagram of a process for making shaped components according to an embodiment of the present invention.

FIG. 2 illustrates a process of forming an optical component according to some embodiments.

At 20, an intermediate work product referred to as a "billet" is formed in a manner that leaves it with residual stress that acts to maintain a transverse extent of the billet. Generally, the billet is formed from an array of previously formed individual waveguides, which may be in the form of "canes" (relatively thick and stiff) or "fibers" (relatively thinner and more flexible). The canes or fibers themselves incorporate residual stress from their production, which involves drawing a thin stream of material from an ingot or block with precise heating as generally known in the art. The billet is formed by placing a collection of such canes or fiber segments together, all oriented along the same optical axis, and fusing them together transversely by application of heat. The billet has an overall residual stress due to the residual stresses in its constituent canes or fiber segments.

At 22, the billet is placed into a mold having the desired shape of the optical component, such as a taper as discussed above. Example are given below. The billet generally fills a substantial portion of the mold, e.g., 80% or more, depending on the amount of relaxation and expansion that will be utilized as described below. In particular, the mold is configured to constrain transverse expansion of the billet according to a desired shape of the optical component.

At 24, the billet is heated while in the mold, to a temperature and for a duration that induces a desired amount of relaxation of the residual stress and corresponding transverse expansion of the billet. The billet expands to fill the mold and conform to its shape, becoming the desired optical component subject to any further processing as described below.

At 26, the component is cooled and removed from the mold, and any required additional processing is performed. This may include trimming, polishing, coating, etc. as generally known in the art.

In the above method, the relaxing billet expands in the transverse direction to fill the mold, giving the resulting component the desired shape. The mold may have very short-length transitions, which the expanding billet will conform to. The billet can be pre-formed in a separate process that includes first drawing canes of a desired size, while controlling the amount of residual stress. The canes are stacked and heated to fuse them into the billet, while continuing to control for residual stress to enable the above processing of the billet to yield the desired result.

Figure 3:
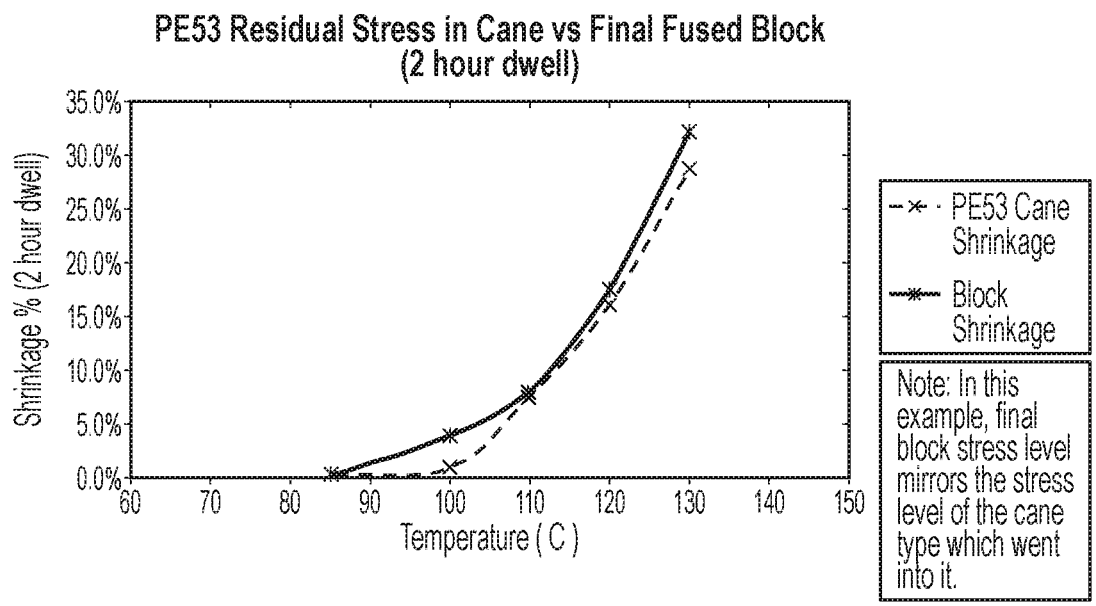
FIG. 3 is a graph illustrating residual stress as temperature-related shrinkage of a fused block.

FIG. 3 is a plot illustrating the presence and effect of residual stress, in terms of shrinkage over a temperature range. Here, "shrinkage" refers to axial shrinkage which occurs due to temperature-induced relaxation of the residual stress. In the specific illustrated example, shrinkage in a range of 0% to about 30% occurs over a temperature range from about 90 C to about 130 C, assuming a "dwell" duration of 2 hours (i.e., exposing the block to a given temperature for 2 hours). FIG. 3 shows separate plots for an individual cane versus a fused block, but it can be seen that the block characteristic closely tracks the characteristic of its individual canes.

Figure 4:
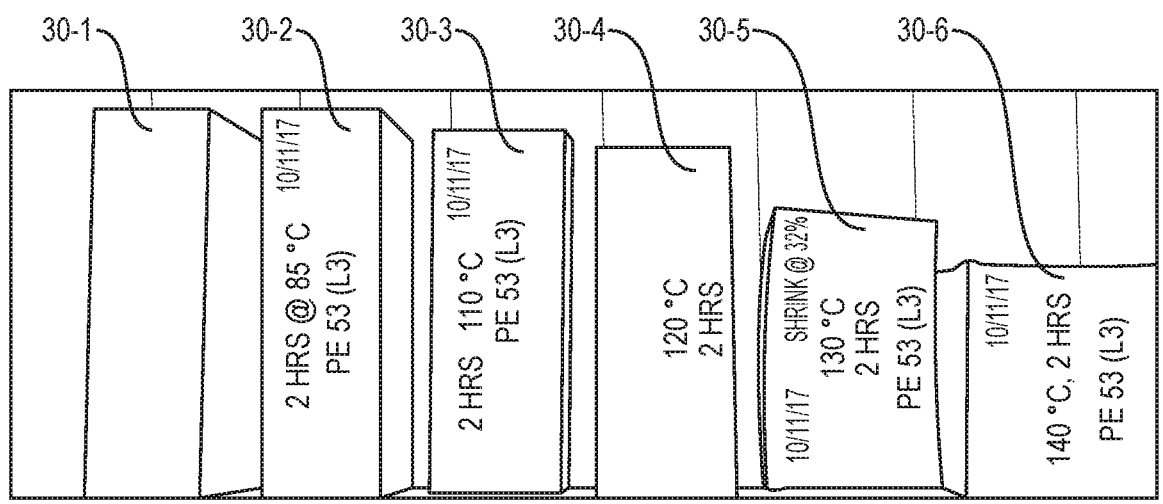
FIG. 4 is a schematic depiction of example fused blocks with corresponding temperature-related shrinkage.

FIG. 4 shows examples of actual billets or blocks 30 that have experienced various degrees of shrinkage as expressed in FIG. 3. Six blocks 30-1, 30-2, ..., 30-6 are shown, all having started at the same size (exemplified by block 30-1 at left) and being heated for two hours at respective temperatures. It will be observed that along with axial shrinkage comes corresponding transverse expansion, which is the effect being relied upon for mold-constrained shaping as described herein. These examples are summarized in the table below:

| # | Temperature | Shrinkage |
|---|---|---|
| 30-1 (starting) | n/a | n/a |
| 30-2 | 85 C. | 0% |
| 30-3 | 110 C. | 8% |
| 30-4 | 120 C. | 17% |
| 30-5 | 130 C. | 32% |
| 30-6 | 140 C. | 44% |

Figure 5:
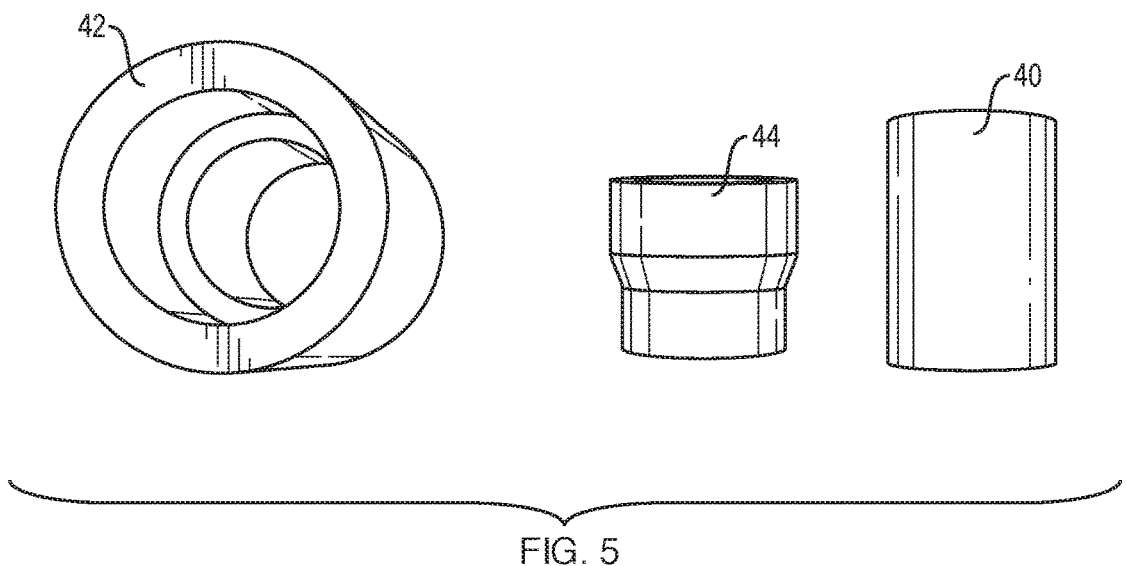
FIG. 5 is a depiction of an example mold, billet and finished product resulting from the presently disclosed process.

FIG. 5 shows examples of a starting billet 40, mold 42 and optical component 44 resulting from the process of FIG. 2. In this example the mold 42 is circularly cylindrical, and its interior has two different-radius cylindrical regions joined by a short taper region. The billet 40 has a radius slightly smaller than the smaller-radius section of the mold 42. As the billet 40 relaxes during processing, it expands transversely to fill the interior of the mold 42, taking on its shape as shown in the resulting component 44.

Figure 6:
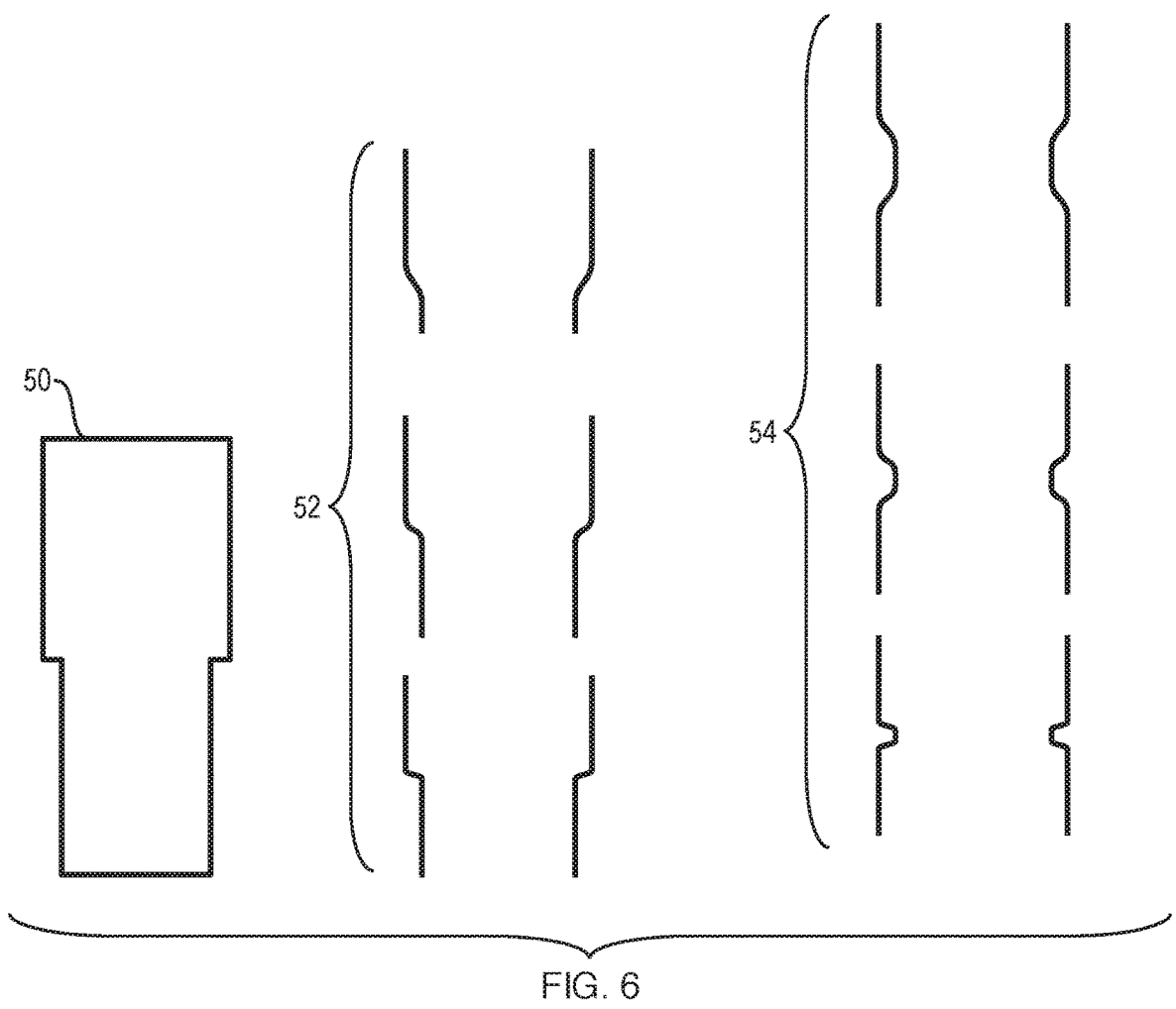
FIG. 6 is a set of schematic depictions of example mold cross-sections.

FIG. 6 shows several example profiles (axial cross sections) of alternative expansion molds. At 50 is an example having an abrupt transition, i.e., an immediate step from one radius to another, while the remaining examples have more gradual transitions. The examples 52 in the center of FIG. 6 are single-ended, i.e., have only one transition, while the examples 54 at the right are double-ended, i.e., have transitions from wide to narrow and back to wide. The examples 54 may be seen as analogous to the heat-and-draw method insofar as providing for making two tapers by making a separation at the narrow portion. As described below, a mold may actually include more than one cycle of such paired transitions, and several components can be made by slicing the resulting intermediate workpiece transversely.

FIGS. 5 and 6 illustrate that the disclosed technique can generate tapers for which the axial length of the taper region is less than half of the cross-sectional sizes of the regions. The extreme example is at 50, where the taper is essentially a zero-length step. In the example of FIG. 5, the ratio of taper length to cross-sectional diameter is approximately 1:4.

Figure 7:
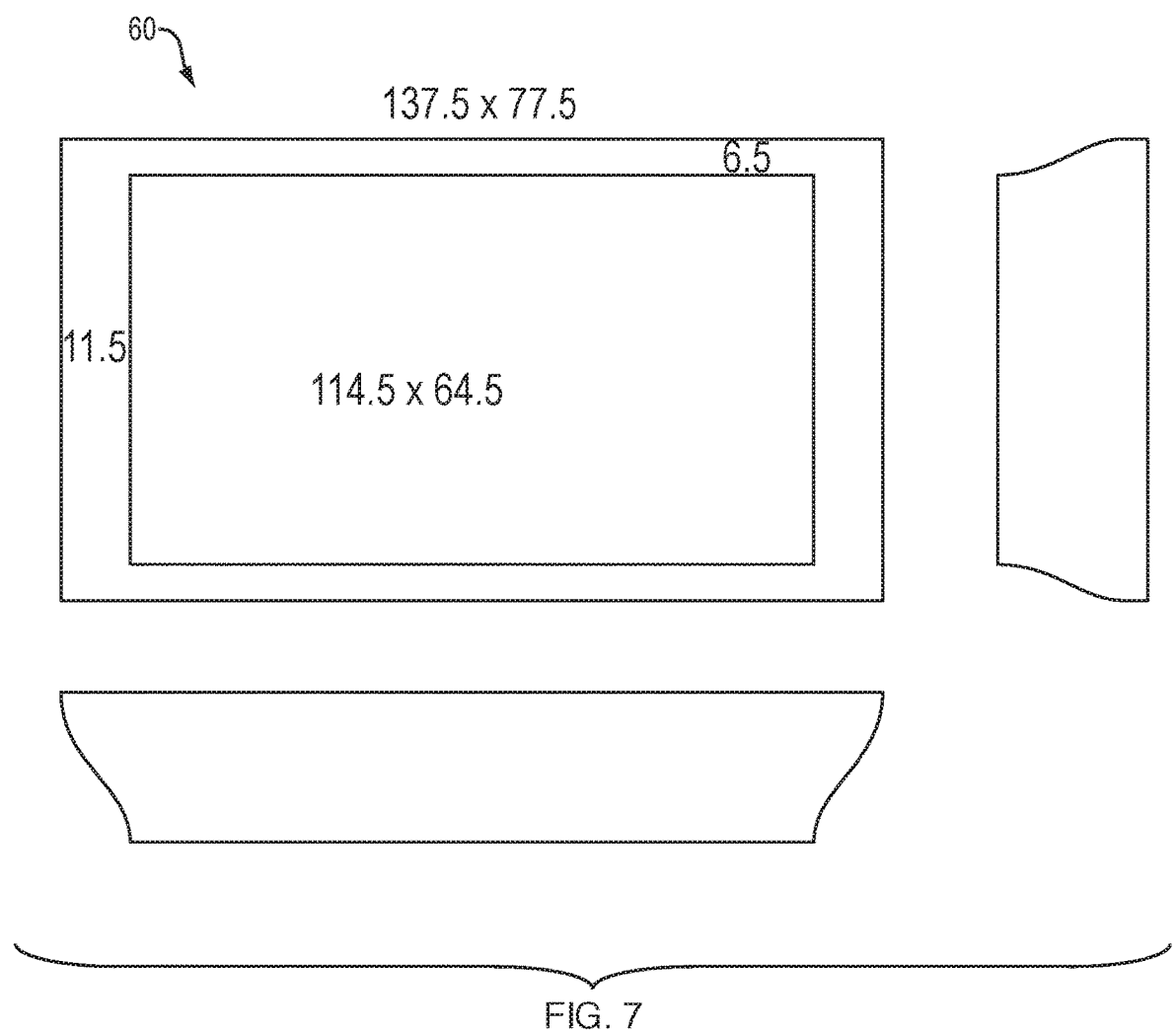
FIG. 7 is a set of views of a square-shaped taper.

FIG. 7 is a diagram of an example rectangular tapered component 60, made from a mold whose interior matches the tapered outside shape. Both a plan view and two end views are shown, along with example dimensions. The broader/wider section is 137.5×77.5 mm, and the narrower section is 114.5×64.5 mm. As indicated, the transitions are of 6.5 and 11.5 mm.

Figure 8:
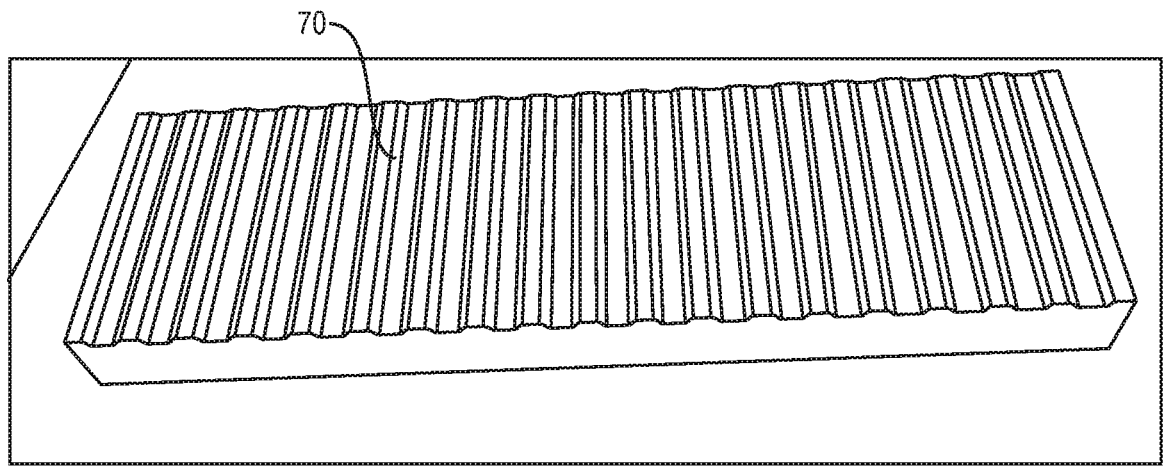
FIGS. 8 and 9 are views of one side of a mold for making several tapers.
Figure 9:
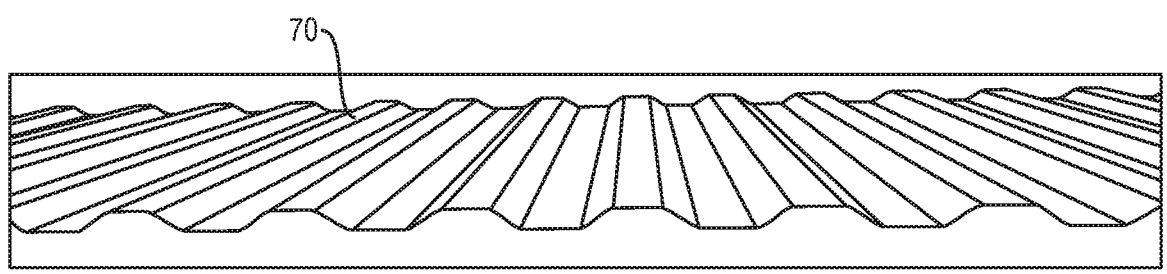

FIGS. 8-9 illustrate a mold wall 70 having multiple expansion regions as mentioned above. A mold wall like this can be arranged with other walls to make an overall mold for creating several tapers by slicing in the direction parallel to the grooves. If four walls similar to wall 70 are used, the resulting optical devices have a square shape with tapers on all four sides, similar to the example of FIG. 7. Alternatively, one or more of the walls may be flat or have some other edge shape as may be dictated by the application.

Figure 10:
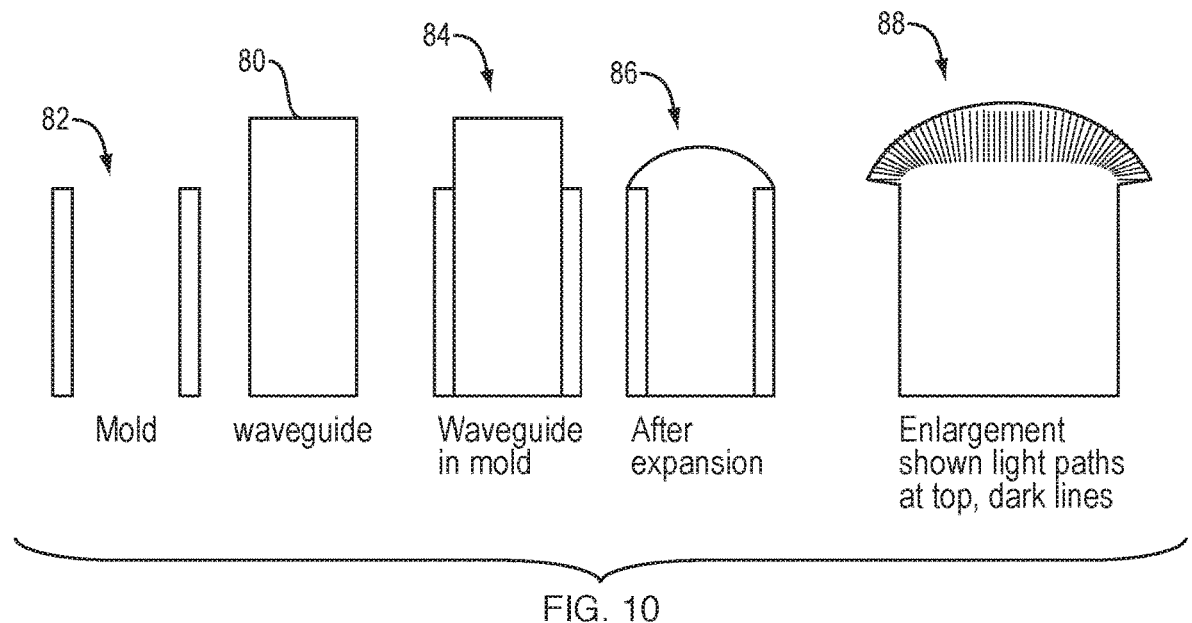
FIG. 10 is a schematic illustration of example mold and workpieces in an example of the disclosed process.

FIG. 10 shows an approach in which part of a billet 80 (shown as "waveguide") is outside of the mold 82 and undergoes a flaring type of expansion. In this example the mold 82 is straight-cylindrical, and the billet 82 is longer than the mold and thus extends beyond one end, as shown at 84. At 86 is shown the result of processing, and at 88 is an enlargement. The upper portion of the billet 80 has expanded to a form similar to a mushroom cap, and the individual waveguides (corresponding to the precursor canes or fibers as described above) flare outwardly as shown.

The component 86/88 of FIG. 10 can be machined to make it flat on top and sloped or rounded near the edges. Light will exit as shown on the sides, which can be round rectangular etc. The depictions in FIG. 10 may be somewhat simplified. In actuality, resulting component 86/88 might tend to be flatter in the center, especially for larger components. Components like those of FIG. 10 may be of interest for some consumer devices.

Figure 11:
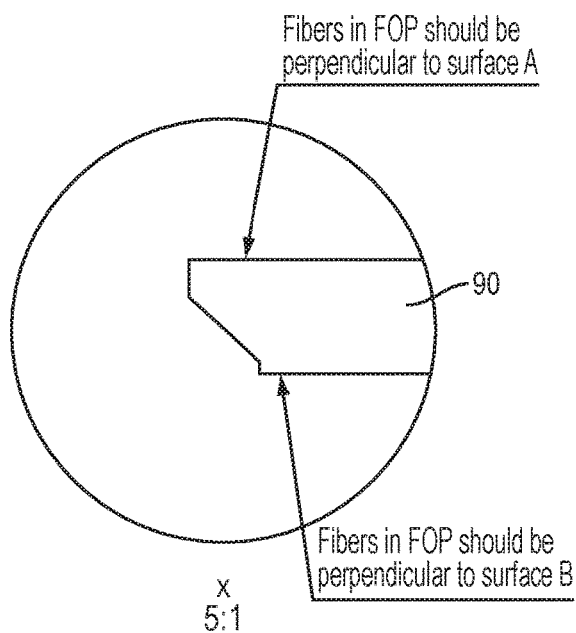
FIG. 11 is a close-up view of an edge of the taper of FIG. 7.

FIG. 11 illustrates perpendicularity of the constituent fibers at the faces of a taper 90 (the faces being at top and bottom in this view). For most applications of tapers, it is desirable that the fibers are perpendicular to the input and output faces. If the fibers are not perpendicular, light is not directed normally but instead at an undesired angle. FIG. 11 shows that a taper made according to the presently disclosed technique can provide such perpendicularity. In this example, the taper 90 has three sections—perpendicular adjacent to top surface, then sloping, then perpendicular to bottom surface.

Figure 12:
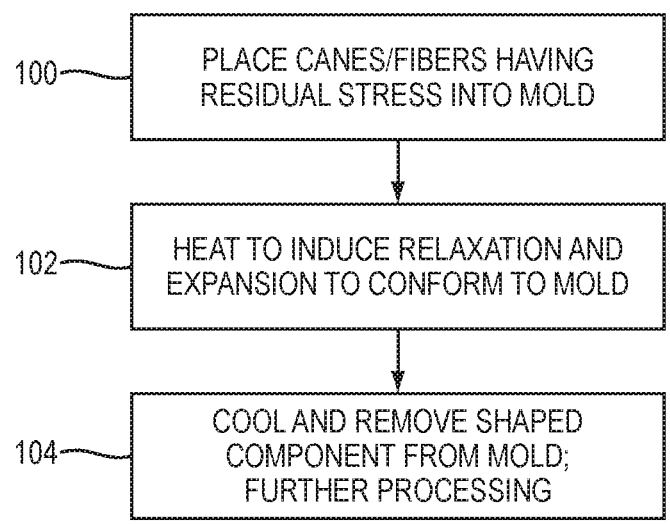
FIG. 12 is a flow diagram of a process for making shaped components according to another embodiment of the present invention.

FIG. 12 shows a processing method that is an alternative to the method of FIG. 2 described above. The heating step 102 and cooling/removal step 104 are similar to the corresponding steps 24, 26 of the process of FIG. 2. The main difference is the use of a single step 100 in which canes or fibers are placed into the mold, rather than starting with a billet that was previously made from canes or fibers. By this technique, the heating at 102 not only provides for the desired relaxation and expansion, but also the fusing of the individual canes or fibers that was performed separately in the process of FIG. 2.

While various embodiments of the invention have been particularly shown and described, it will be understood by those skilled in the art that various changes in form and details may be made therein without departing from the scope of the invention.

What is claimed is:

1. A method of making a waveguiding optical component, comprising:
   processing a polymer optical material to form a billet having an axis of light transmission and having residual stress maintaining a transverse extent of the billet;
   placing the billet into a mold, the mold being configured to constrain transverse expansion of the billet according to a desired shape of the waveguiding optical component; and
   heating the billet in the mold to induce relaxation of the residual stress and corresponding transverse expansion of the billet, thereby forming the billet into the waveguiding optical component with the desired shape,
   wherein the mold is generally cylindrical and has an interior having two regions of different cross-sectional sizes joined by a taper region.

2. The method of claim 1, wherein the mold is circularly cylindrical and the two regions have respective different radiuses.

3. The method of claim 1, wherein the taper region has a length less than half of the cross-sectional sizes of the regions.

4. The method of claim 1, wherein the mold has a rectangular cross-section and the two regions have respective different lengths and widths.

5. A method of making a waveguiding optical component, comprising:
   processing a polymer optical material to form a billet having an axis of light transmission and having residual stress maintaining a transverse extent of the billet;
   placing the billet into a mold, the mold being configured to constrain transverse expansion of the billet according to a desired shape of the waveguiding optical component; and
   heating the billet in the mold to induce relaxation of the residual stress and corresponding transverse expansion of the billet, thereby forming the billet into the waveguiding optical component with the desired shape,
   wherein the mold is configured for only partial constraining of the billet, and wherein during the transverse expansion the billet has a constrained portion and an unconstrained portion, the constrained portion being constrained by the mold and taking on a shape thereof during the heating, the unconstrained portion not being constrained by the mold and expanding beyond an envelope of the mold during the heating to form a flared portion of the waveguiding optical component.

6. The method of claim 5, wherein the mold is generally cylindrical and has a length shorter than an axial length of the billet, and wherein the billet is placed into the mold with one end extending beyond a corresponding end of the mold, the one end being the unconstrained portion of the billet.

7. The method of claim 6, wherein the unconstrained portion takes on a mushroom-cap shape during the heating.

8. The method of claim 7, further including additional processing of the waveguiding optical component to flatten a central portion of the mushroom-cap-shaped unconstrained portion.

9. The method of claim 1, further including additional processing of the waveguiding optical component to create a final optical component.

10. The method of claim 9, wherein the additional processing includes trimming the waveguiding optical component in the transverse direction to produce the final optical component having a corresponding axial length.

11. The method of claim 9, wherein the waveguiding optical component has a repeating pattern of wider and narrower portions joined by respective tapers, and wherein the trimming includes slicing the waveguiding optical component into a plurality of single-taper final optical components each including a respective one of the tapers.

12. A method of making a waveguiding optical component, comprising:
    placing a plurality of aligned polymer optical canes into a mold, the canes having residual stress maintaining transverse extents thereof, the mold being configured to constrain transverse expansion of the canes according to a desired shape of the waveguiding optical component; and
    heating the canes in the mold to induce relaxation of the residual stress and corresponding transverse expansion of the canes, thereby (a) fusing the canes and (b) forming the fused canes into the waveguiding optical component with the desired shape,
    wherein the mold is generally cylindrical and has an interior having two regions of different cross-sectional sizes joined by a taper region.

13. The method of claim 12, wherein the mold is circularly cylindrical and the two regions have respective different radiuses.

14. The method of claim 12, wherein the taper region has a length less than half of the cross-sectional sizes of the regions.

15. A method of making a waveguiding optical component, comprising:
    placing a plurality of aligned polymer optical canes into a mold, the canes having residual stress maintaining transverse extents thereof, the mold being configured to constrain transverse expansion of the canes according to a desired shape of the waveguiding optical component; and
    heating the canes in the mold to induce relaxation of the residual stress and corresponding transverse expansion of the canes, thereby (a) fusing the canes and (b) forming the fused canes into the waveguiding optical component with the desired shape,
    wherein the mold is configured for only partial constraining of the canes, and wherein during the transverse expansion the canes have a constrained portion and an unconstrained portion, the constrained portion being constrained by the mold and taking on a shape thereof during the heating, the unconstrained portion not being constrained by the mold and expanding beyond an envelope of the mold during the heating to form a flared portion of the waveguiding optical component.

16. The method of claim 15, wherein the mold is generally cylindrical and has a length shorter than an axial length of the canes, and wherein the canes are placed into the mold with one end extending beyond a corresponding end of the mold, the one end being the unconstrained portion of the canes.

17. The method of claim 12, further including additional processing of the waveguiding optical component to create a final optical component.

18. The method of claim 17, wherein the additional processing includes trimming the waveguiding optical component in the transverse direction to produce the final optical component having a corresponding axial length.

19. The method of claim 12, wherein the mold has a rectangular cross-section and the two regions have respective different lengths and widths.

20. The method of claim 15, wherein the unconstrained portion takes on a mushroom-cap shape during the heating.

* * * * *